United States Patent [19]
On et al.

[11] Patent Number: 5,812,952
[45] Date of Patent: Sep. 22, 1998

[54] METHOD FOR TRANSMITTING VOICE AND DATA IN A COMMUNICATION SYSTEM

[75] Inventors: David Bar On, Rehovot, Israel; Daniel J. McDonald, Cary, Ill.; Leonard M. Wurtzel, Kochav Yair, Israel

[73] Assignee: Motorola, Inc., Schaumburg, Ill.

[21] Appl. No.: 555,240

[22] Filed: Nov. 8, 1995

(Under 37 CFR 1.47)

[51] Int. Cl.⁶ ..................................... H04Q 7/20
[52] U.S. Cl. .......................... 455/452; 455/453; 455/511; 455/512; 370/280
[58] Field of Search ................................. 370/280, 294, 370/327, 337, 347; 455/34.1, 34.2, 54.1, 54.2, 62, 450–452, 455, 509–510, 512, 516–518, 527–528, 453, 511

[56] References Cited

U.S. PATENT DOCUMENTS

| | | | |
|---|---|---|---|
| 4,741,049 | 4/1988 | De Jager et al. | 455/34.2 |
| 4,780,715 | 10/1988 | Kasugai | 455/528 |
| 5,420,574 | 5/1995 | Erickson et al. | 455/34.1 |
| 5,568,511 | 10/1996 | Lampe | 455/34.1 |
| 5,613,207 | 3/1997 | Wilson et al. | 455/509 |

FOREIGN PATENT DOCUMENTS

| | | | |
|---|---|---|---|
| 3-58524 | 3/1991 | Japan | 455/34.1 |
| WO88/08647 | 11/1988 | WIPO | 455/34.1 |

*Primary Examiner*—Nguyen Vo
*Attorney, Agent, or Firm*—Daniel C. Crilly

[57] ABSTRACT

A communication system includes a central unit (18), a plurality of remote units and a plurality of uplink and downlink communication resources (10, 12) for communication between the central unit (18) and the plurality of remote units. A signaling channel is provided on one of the plurality of downlink communication resources (10) and traffic channels are provided on the plurality of uplink communication resource (12). Signaling information is provided on the downlink signaling channel indicating positively which of one or more of the plurality of uplink communication resources (12) is to be used for temporary transmission of message data by at least one of the plurality of remote units, independent of downlink communication resource (10) allocation.

7 Claims, 6 Drawing Sheets

5,812,952

METHOD FOR TRANSMITTING VOICE AND DATA IN A COMMUNICATION SYSTEM

FIELD OF THE INVENTION

This invention relates to a communication system comprising a central unit, a number of remote units communicating on multiple communication channels and an arrangement for allocating unused communication channels. Separately, and in addition, the invention relates to a central unit and a remote unit of such a system. The invention is applicable to, but not limited to, wide area trunking systems having packet data transmissions.

BACKGROUND OF THE INVENTION

In most trunked radio systems, that provide data communications, subscriber radios receive data packets from a central unit on inbound channels and transmit data packets to the central unit on outbound channels. Typically, paired inbound and outbound channels are allocated for data communications when a communications channel is required by either the central unit or a subscriber unit. Communications channels are allocated if they are idle, and therefore available, or if the channel has already been allocated, but is not currently being used, for example with inbound channels during a wide area broadcast call.

In the field of a mobile radio system having a single channel pair, British Patent Application No. GB-A-2217995 describes a multiple access communications system for data communication between one or more base stations and a number of mobile units. The uplink and downlink are frame based and the frames of the uplink are divided into slots. Predetermined slots of the uplink are designated as control slots and predetermined slots are designated as data traffic slots. Further predetermined slots of the uplink are designated as special slots which can be used to supplement the data traffic slots or the control slots. The arrangement is somewhat rigid and limited in its usefulness.

Air interface protocols are generally balanced in that the amount of uplink information is broadly speaking balanced by the amount of downlink information. Also the maximum capacity of the uplink is normally fairly well balanced by the capacity of the maximum downlink capacity.

In a scenario where the communication is semi-duplex and may use multiple cells, in some cells the downlink traffic may be occupied by the traffic, but the paired uplink channel may not be in use for traffic. This is particularly true in group call set-ups where one downlink resource is used for each member of the group (broadcasting to the group) but only one uplink resource is used (only one group member transmits at a given time). In a rigidly designed system, an uplink resource is paired with each downlink resource and these uplink resources are under-utilized.

In a scenario where the communication is semi-duplex and may involve a line connected terminal as one of the users, the downlink traffic may be occupied by traffic (from the line connected terminal) but the paired uplink channel may not be in use for traffic.

This invention seeks to provide an improved method for channel utilization in communications systems.

The preferred embodiment of the invention will now be described, by way of example only, with reference to the drawings.

DETAILED DESCRIPTION OF A PREFERRED EMBODIMENT

Figure 1:
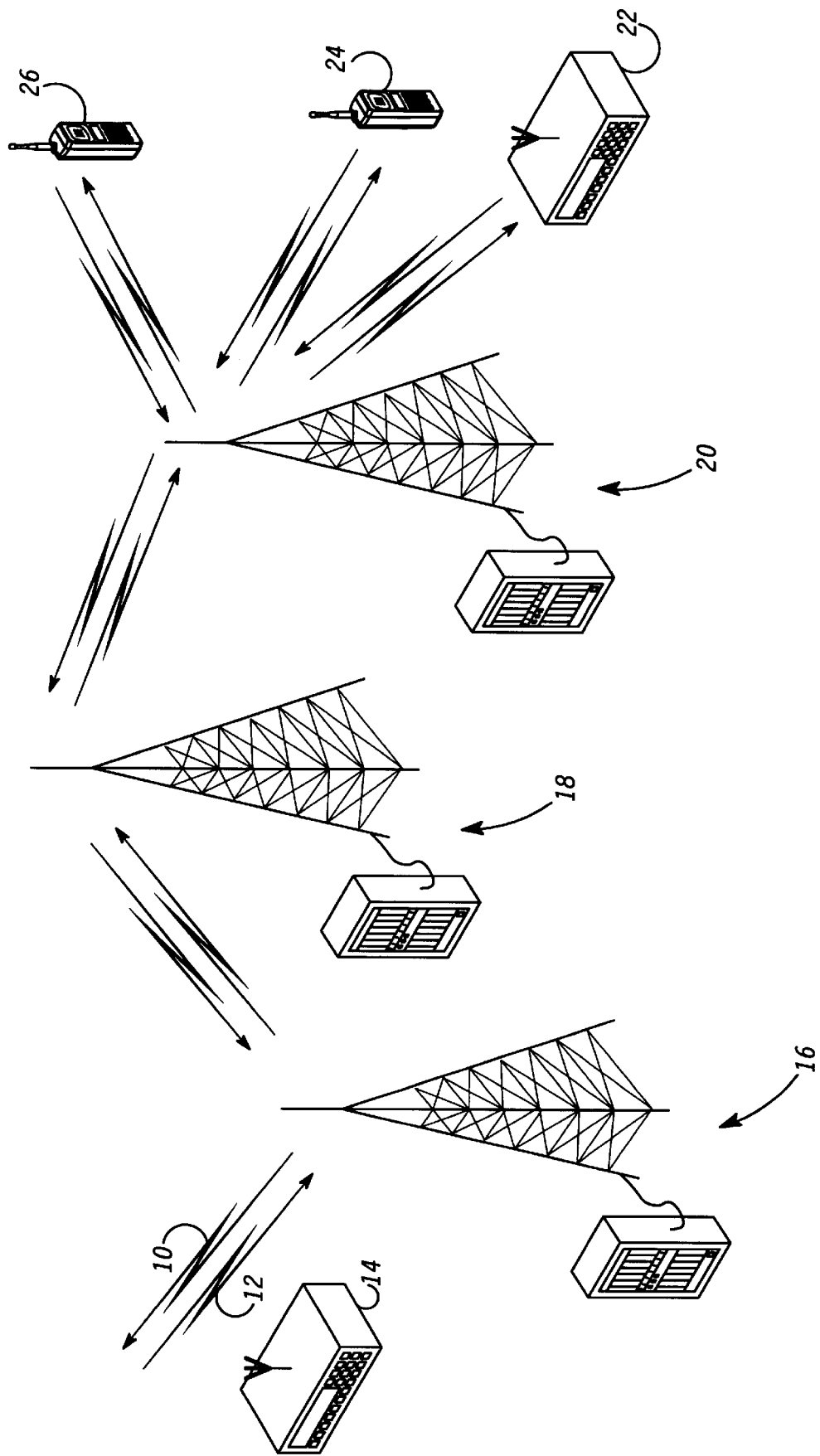
FIG. 1 is a block diagram of a communication system according to a preferred embodiment of the invention.

Referring first to FIG. 1, a block diagram of a communication system is shown according to a preferred embodiment of the invention.

The communication system, e.g. a wide-area multi-site trunking system, includes at least one central unit 18, a first site controller 16 and a second site controller 20. A first site includes a first radio unit 14 and a second site includes a second radio unit 22, a third radio unit 24 and a fourth radio unit 26. The communication system includes a plurality of downlink communication resources 10 and a plurality of uplink communication resources 12 for communication from the plurality of remote (radio) units to the at least one central unit. A plurality of traffic channels are provided on the plurality of uplink communication resources.

In operation, the central unit 18 transmits signaling information, i.e. a channel grant command, on the downlink signaling channel to at least one remote unit. The channel grant command indicates positively one or more of the plurality of uplink communication resources 12 to be used for temporary transmission of message data by at least one remote unit, independent of allocation of downlink communication resource 10.

In a preferred embodiment of the present invention, the communications system operates a time division multiple access (TDMA) protocol. The TDMA protocol provides signaling frames having signaling time slots and traffic frames having traffic time slots on both the uplink and downlink communications resources. Preferably, signaling information is transmitted on a downlink signaling time slot and one or more of the uplink traffic channels reside on traffic time slots which are separated from the downlink signaling time slot by a time interval sufficient for a remote unit to switch from a receive operation to a transmit operation.

Figure 2:
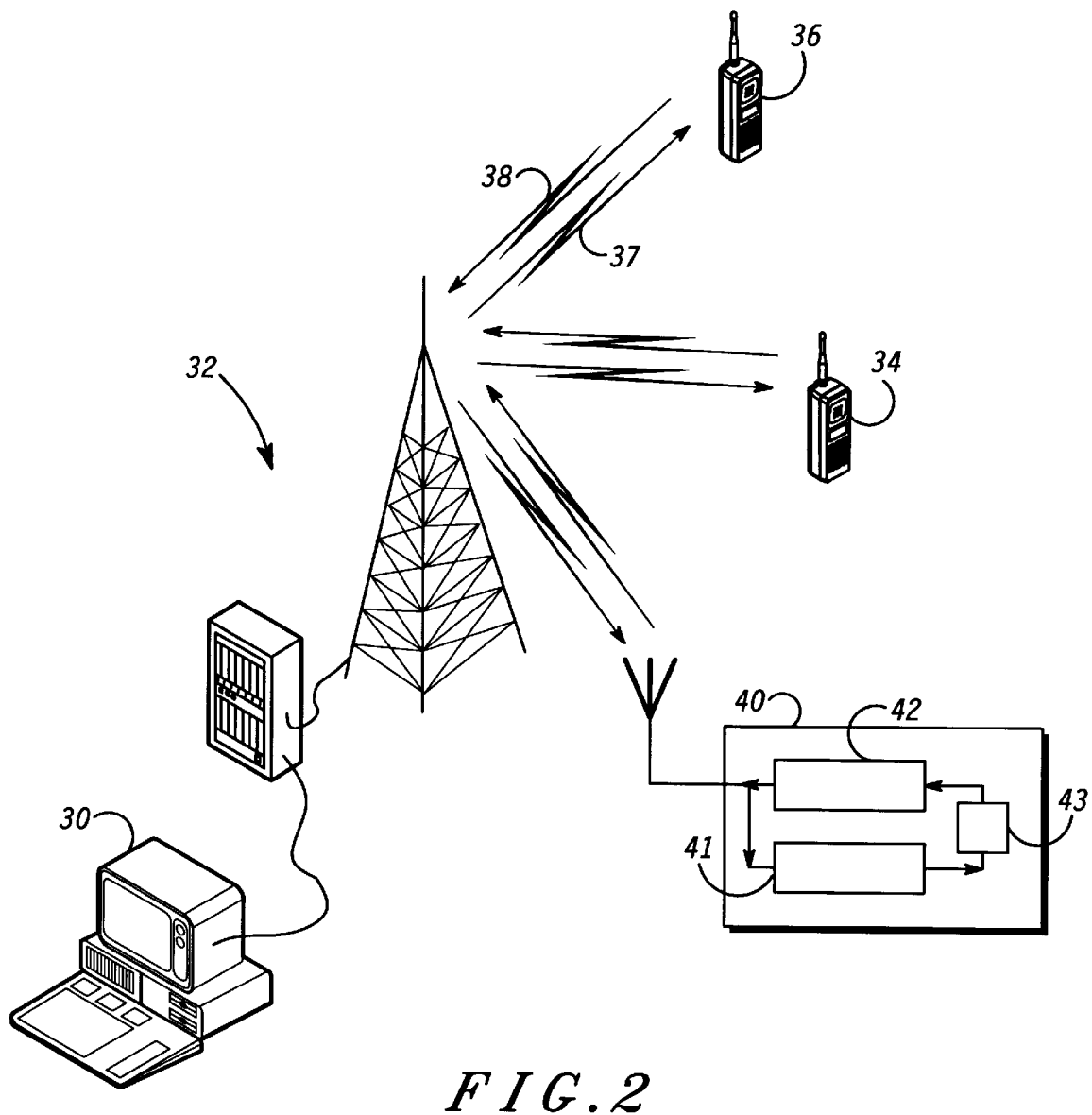
FIG. 2 is a block diagram of a single site communication system according to an alternative feature of the invention.

Referring now to FIG. 2, a block diagram of a single site communication system according to an alternative feature of the present invention is shown. The communication system of FIG. 2 may operate within the wide-area communications system of FIG. 1. The single site communications system includes a central unit 32 and a plurality of remote units 34, 36 and 40. A plurality of downlink communication resources 37 are provided in the communication system for communication from the central unit 32 to the remote units 34, 36 and 40. A plurality of uplink communication resources 38 are provided for communication from the remote units 34, 36 and 40 to the central unit 32. A signaling channel is provided on one of the plurality of downlink communication resources 37. The central unit is operably coupled via a wired input to an external source 30 for receiving traffic from the external source 30. The central unit 32 is responsive to the traffic from the external source 30. The remote unit 40 includes a receiver 41 for receiving signaling information from the central unit 32 on a downlink communication resource and a transmitter 42 for transmitting signaling and traffic information on an uplink communications resource. The remote unit also includes a processing device 43 for selectively retuning the transmitter of the remote unit in order to transmit message data in either the signaling channel or a traffic channel on the uplink communications resource, dependent upon the signaling information received from the central unit 32.

Figure 3:
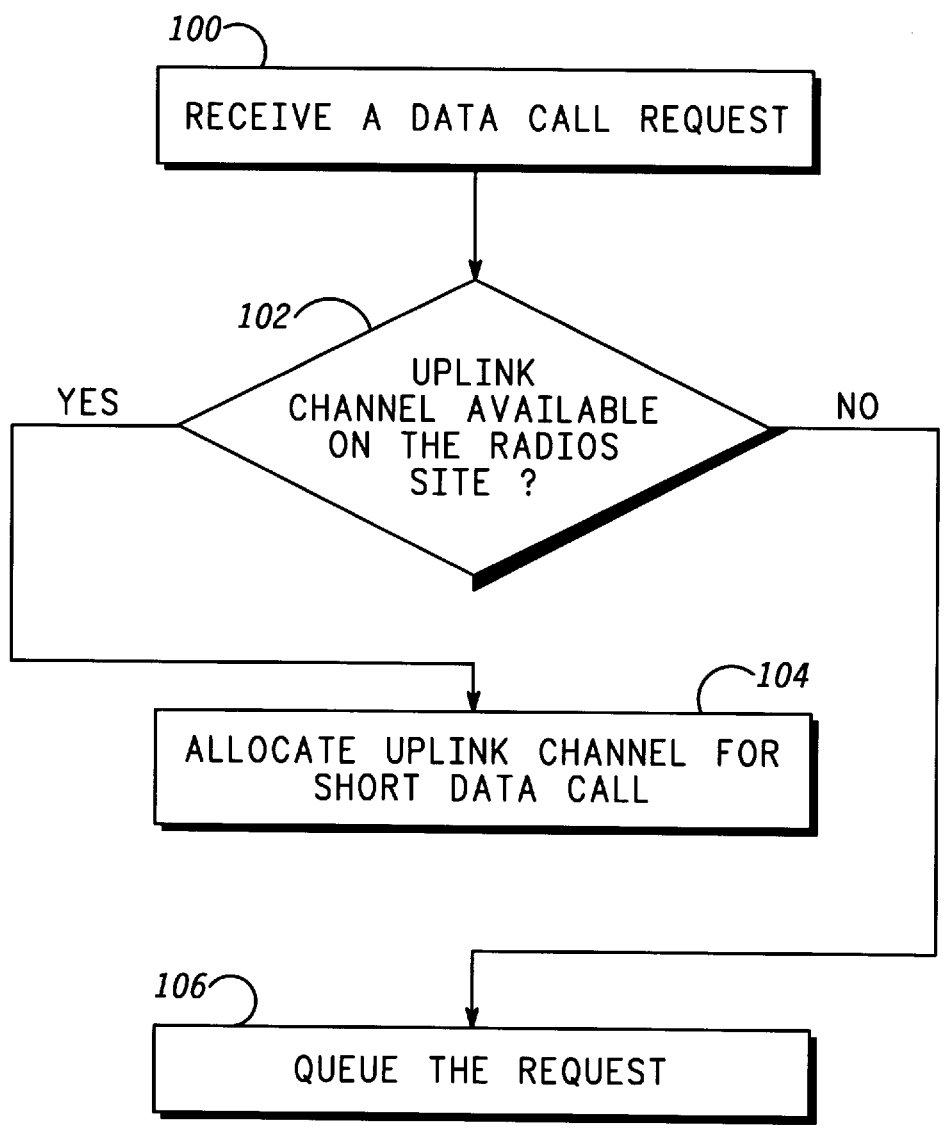
FIG. 3 is a flow chart showing a method for detecting a free uplink communications channel when a short data call arrives according to the preferred embodiment of the invention.
Figure 4:
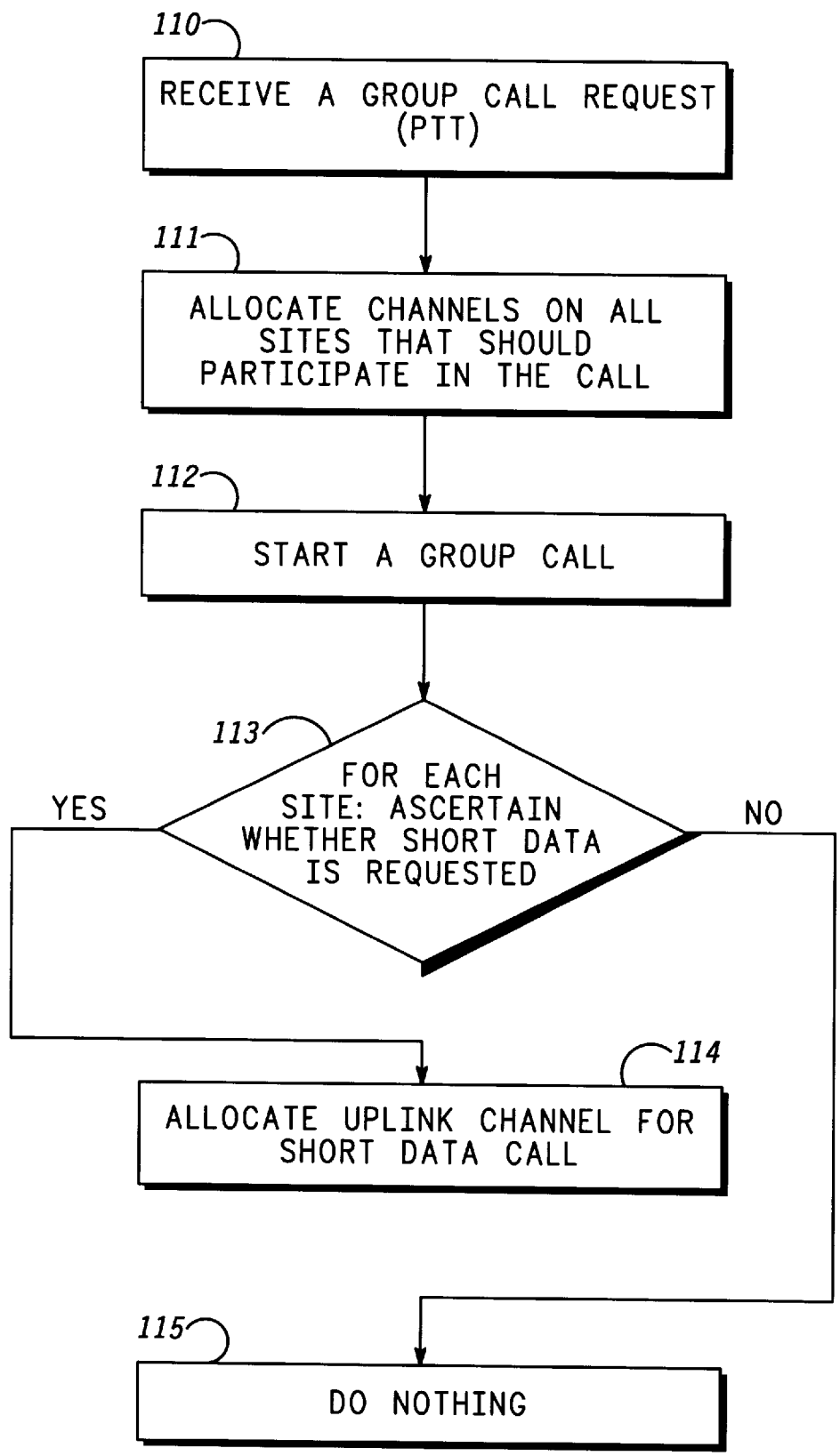
FIG. 4 is a flow chart showing a method for detecting a free uplink communications channel when receiving a group call request according to the preferred embodiment of the invention.
Figure 5:
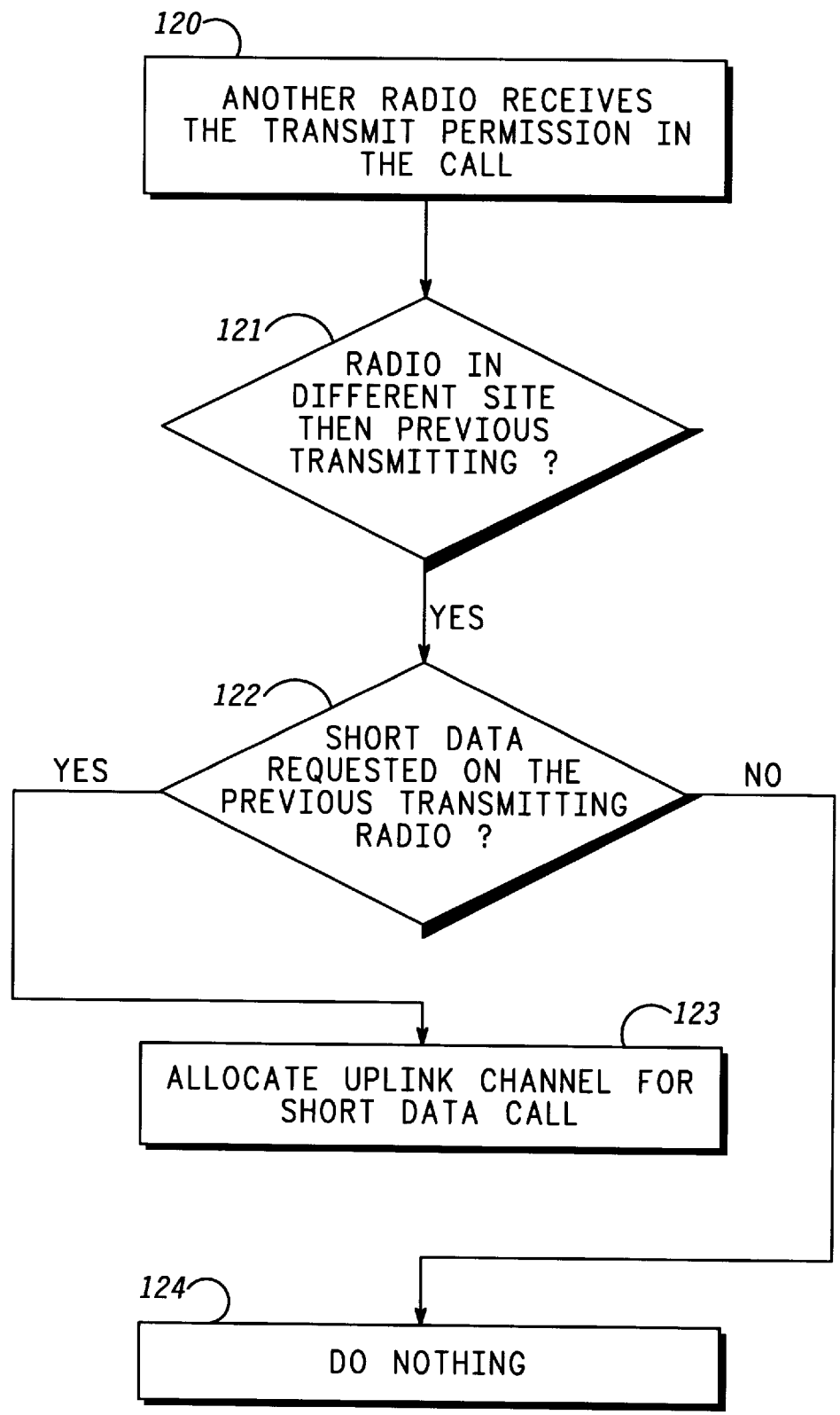
FIG. 5 is a flow chart showing a method for detecting a free uplink communications channel when one radio stops transmitting and another radio starts to transmit according to the preferred embodiment of the invention.

Referring now to FIGS. 3, 4 and 5, methods of operating the communications system of FIG. 1 are shown. The method includes the steps of monitoring a plurality of traffic channels on the uplink communication resources by the central unit and transmitting signaling information from the central unit to the remote units on the downlink signaling channel indicating the availability of at least one of the plurality of uplink communication resources 12 for transmission of message data.

A first method of detecting an available uplink communications resource when a short data call arrives, according to a first feature of the preferred embodiment of the invention, is shown in FIG. 3. The method for detecting an available uplink communications resource when a short data message arrives, includes the steps of receiving a short data message request from the central unit 18, as in step 100. The central unit 18 searches for an available uplink communications resource, as shown in step 102. The central unit 18 allocates at least one available uplink communications resource for short data messages as in step 104. If there are no available uplink communications resources, the central unit 18 queues the request, as shown in step 106.

A second method for detecting an available uplink communications resource when receiving a group call request is shown in FIG. 4 according to a second feature of the preferred embodiment of the invention. The method for detecting an available uplink communications resource when receiving a group call request includes the steps of receiving a group call request from the central unit 18, as shown in step 110. The central unit 18 allocates channels on all sites required in the call, as in step 111 and starts the group call as shown in step 112. Each site that is participating in the call checks whether a short data message has been requested, as shown in step 113. If a short data message has been requested on a particular site, the central unit of the particular site, e.g. first site controller 16, allocates at least one uplink communications resource for short data messages, as in step 114. Otherwise, the first site controller 16 does nothing as shown in step 115.

A third method, of detecting an available uplink communications resource when one radio stops transmitting and another radio starts to transmit is shown in FIG. 5, according to a preferred embodiment of the invention. The method includes the steps of a first radio unit 14 receiving permission from the central unit to transmit in the call as shown in step 120. If a second radio unit 22, operating in a different site, is transmitting as shown in step 121 and a short data request has been made by the first radio unit 14, as shown in step 122 then the first site controller 16 allocates an uplink communications resource for short data messages, as shown in step 123. If a short data was not requested on the first radio unit 14 then the first site controller 16 does nothing as shown in step 124.

Figure 6:
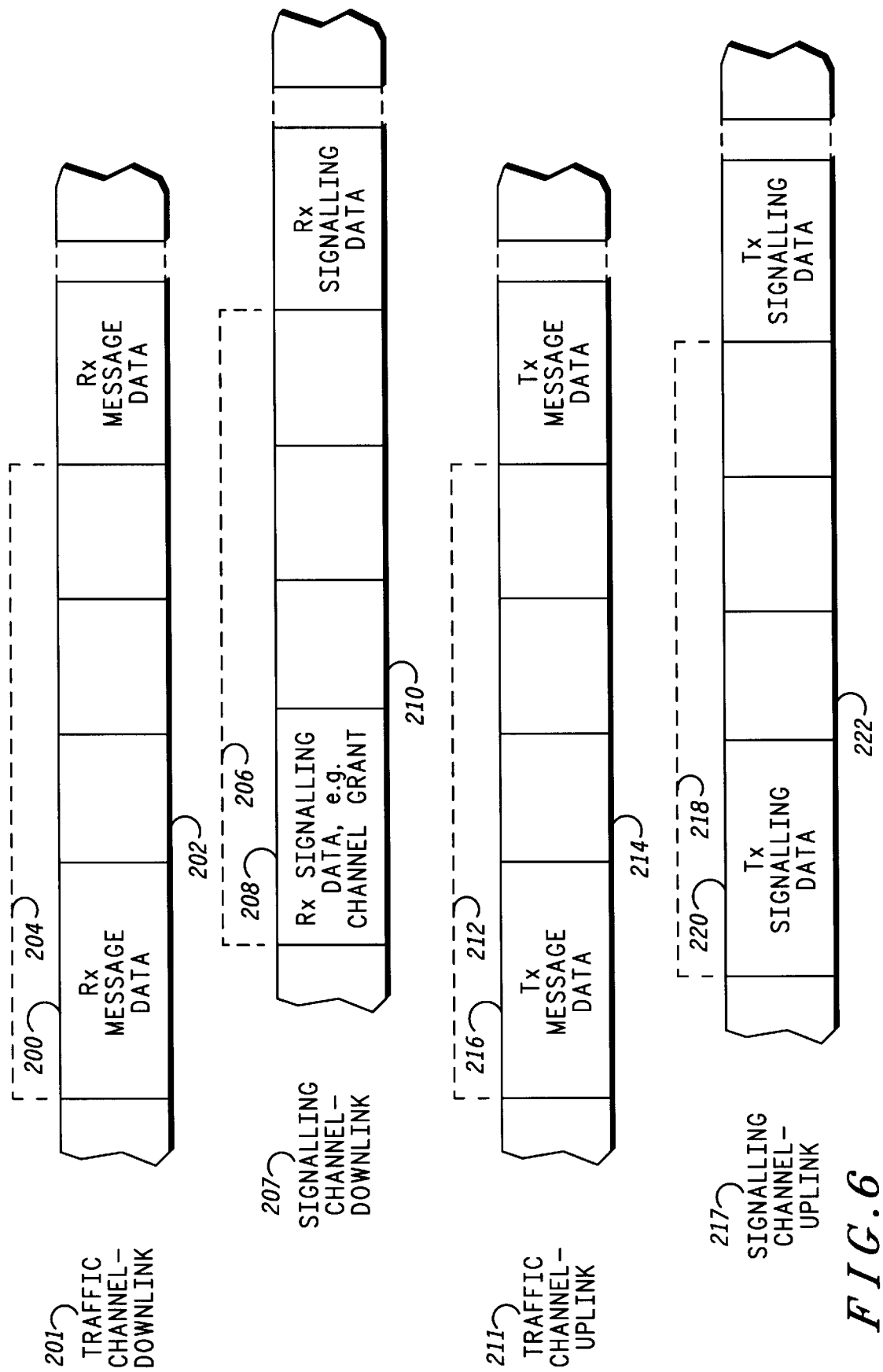
FIG. 6 is a timing diagram showing traffic channel uplink and downlink time slots and time frames and signaling channel uplink and downlink time slots and time frames according to the preferred embodiment of the invention.

Referring now to FIG. 6, a timing diagram of a traffic channel having uplink and downlink traffic frames including traffic time slots and signaling channel having uplink and downlink signaling frames including signaling time slots, according to the preferred embodiment of the invention shown. A traffic channel downlink timing diagram 201 includes traffic frames 204. The traffic frame 204 includes receive message data 200 in one of a number of downlink traffic time slots 202. A traffic channel uplink timing diagram 211 includes traffic frames 212. The traffic frame 212 includes transmitter message data 216 in one of a number of uplink traffic time slots 214. A signaling channel downlink timing diagram 207 includes a downlink signaling frames 206. The downlink signaling frame 206 includes receive signaling data, e.g. a channel grant command 208, in one of a number of downlink signaling time slots 210. A signaling channel uplink timing diagram 217 includes uplink signaling frames 218. The uplink signaling frame 218 includes transmitter signaling data 220, in one of a number of uplink signaling time slots 222.

In operation, the uplink communications resource and the downlink communications resource are time divided in a time division multiplexed protocol to provide signaling frames having signaling time slots and traffic frames having traffic time slots. The signaling information is transmitted on a downlink signaling time slot 210 and at least one of the uplink traffic time slots 212 are separated from the downlink signaling time slot 210 by a period sufficient for a remote unit to switch from a receive operation to a transmit operation.

Advantageously, an uplink communications resource, previously allocated for a first communication, is used to transmit data packets and/or control information, e.g. registration command, from the radio units to the central controller in a second communication. Response to these transmissions is normally short, e.g. an acknowledge message, and is generally transmitted on the downlink signaling channel.

Thus, a communication system, a remote unit for operation on the communication system and a method for improving the channel utilization in such communications systems are provided.

We claim:

1. A method for a central unit to allocate communication channels to facilitate the transmission of voice and data in a communication system, the method comprising the steps of:

allocating a first uplink channel and a first downlink channel to support a voice call of a first remote unit;

receiving a request on a second uplink channel from a second remote unit while the first remote unit is participating in the first call, wherein the request indicates that the second remote unit desires to engage in a data call;

monitoring the first uplink channel for availability to transmit message data;

when the first uplink channel is available for transmission of message data, transmitting signaling information to the second remote unit on a downlink signaling channel indicating temporary allocation of the first uplink channel to the second remote unit to support the data call, such that the first uplink channel is allocated to the first remote unit to support the voice call and is allocated to the second remote unit to support the data call, wherein the temporary allocation of the first uplink channel to the second remote unit allows the second remote unit to transmit message data on the first uplink channel while the first uplink channel remains allocated to support the voice call of the first remote unit and while the first remote unit is receiving voice information on the first downlink channel.

2. The method of claim 1 wherein the signaling information comprises a channel grant command that indicates positively an identity of the first uplink channel.

3. The method of claim 1, wherein the first uplink channel, the second uplink channel, and the downlink signaling channel comprise time division multiplexed time slots.

4. The method of claim 3, wherein the signaling information is transmitted on a downlink signaling time slot and at least one of the uplink time slots are separated from the downlink signaling time slot by a period sufficient for a remote unit to switch from a receive operation to a transmit operation.

5. The method of claim 1, wherein the second uplink channel comprises an uplink traffic channel.

6. The method of claim 1, wherein the first uplink channel comprises a first uplink traffic channel and wherein the second uplink channel comprises an uplink signaling channel.

7. A method for conveying voice and data information in a communication system that includes a central unit and a plurality of remote units, the method comprising the steps of:

allocating, by the central unit, a first uplink traffic channel and a first downlink traffic channel to support a voice call by a first remote unit of the plurality of remote units;

receiving, by the central unit, a request to transmit message data from a second remote unit of the plurality of remote units;

monitoring, by the central unit, the first uplink traffic channel for availability to transmit message data;

when the first uplink channel is available for transmission of message data allocating, by the central unit, the first uplink traffic channel to the second remote unit to support the transmission of message data, such that the first uplink traffic channel is allocated to the first remote unit to support the voice call and is allocated to the second remote unit to support the transmission of message data; and transmitting, by the second remote unit message data via the first uplink traffic channel when the first remote unit is receiving voice information via the first downlink traffic channel and is not presently transmitting voice information via the first uplink traffic channel.

* * * * *